United States Patent
Shi

(10) Patent No.: US 9,851,436 B2
(45) Date of Patent: Dec. 26, 2017

(54) RADAR ANTENNA ASSEMBLY WITH PANORAMIC DETECTION

(71) Applicant: DELPHI TECHNOLOGIES, INC., Troy, MI (US)

(72) Inventor: Shawn Shi, Thousand Oaks, CA (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 453 days.

(21) Appl. No.: 14/589,373

(22) Filed: Jan. 5, 2015

(65) Prior Publication Data
US 2016/0195612 A1 Jul. 7, 2016

(51) Int. Cl.
| G01S 13/93 | (2006.01) |
| G01S 13/04 | (2006.01) |
| G01S 7/03 | (2006.01) |
| H01Q 1/32 | (2006.01) |
| H01Q 21/00 | (2006.01) |
| H01Q 25/00 | (2006.01) |
| G01S 7/02 | (2006.01) |

(52) U.S. Cl.
CPC ............ *G01S 13/04* (2013.01); *G01S 7/03* (2013.01); *G01S 13/931* (2013.01); *H01Q 1/3233* (2013.01); *H01Q 1/3275* (2013.01); *H01Q 21/005* (2013.01); *H01Q 25/00* (2013.01); *G01S 2007/028* (2013.01); *G01S 2013/9382* (2013.01)

(58) Field of Classification Search
CPC . G01S 13/931; G01S 2013/9382; H01Q 1/27; H01Q 1/32; H01Q 1/325; H01Q 1/3275; H01Q 1/36; H01Q 13/10; H01Q 21/00; H01Q 21/0043; H01Q 21/005; H01Q 21/061; H01Q 21/24
See application file for complete search history.

(56) References Cited

U.S. PATENT DOCUMENTS

| 3,987,454 | A | * | 10/1976 | Epis | ............... H01Q 21/0043 333/248 |
| 4,097,868 | A | * | 6/1978 | Borowick | ............... H01Q 1/08 343/727 |
| 4,336,540 | A | * | 6/1982 | Goodwin | ............ G01S 13/422 342/157 |
| 4,924,235 | A | | 5/1990 | Fujisaka et al. | |
| 5,247,306 | A | | 9/1993 | Hardange et al. | |
| 5,291,211 | A | | 3/1994 | Tropper | |
| 5,638,079 | A | * | 6/1997 | Kastner | ................. H01Q 13/22 343/768 |
| 5,726,666 | A | * | 3/1998 | Hoover | ................ H01Q 13/22 343/767 |
| 5,923,302 | A | | 7/1999 | Waterman et al. | |

(Continued)

FOREIGN PATENT DOCUMENTS

CA 2 136 048 A1 5/1995

*Primary Examiner* — Peter M Bythrow
(74) *Attorney, Agent, or Firm* — Lawrence D. Hazelton

(57) ABSTRACT

A radar antenna assembly suitable to mount atop a vehicle as part of a radar system for the vehicle includes a horizontal array and a vertical array. The horizontal array is configured to preferentially detect objects in a forward area and a rearward area about the vehicle. The vertical array is configured to preferentially detect objects in a leftward area and a rightward area about the vehicle. The horizontal array and the vertical array cooperate to detect an object in a panoramic area that surrounds the vehicle.

13 Claims, 7 Drawing Sheets

(56) References Cited

U.S. PATENT DOCUMENTS

| | | | |
|---|---|---|---|
| 5,940,011 A | 8/1999 | Agravante et al. | |
| 6,166,701 A * | 12/2000 | Park | H01Q 21/0037 |
| | | | 333/21 A |
| 6,307,524 B1 * | 10/2001 | Britain | H01Q 19/30 |
| | | | 343/795 |
| 6,351,244 B1 * | 2/2002 | Snygg | H01Q 1/246 |
| | | | 343/770 |
| 6,452,537 B2 | 9/2002 | Quellec et al. | |
| 7,106,270 B2 * | 9/2006 | Iigusa | H01Q 3/242 |
| | | | 343/750 |
| 7,358,912 B1 * | 4/2008 | Kish | H01Q 3/242 |
| | | | 343/725 |
| 7,978,144 B2 * | 7/2011 | Tanabe | H01Q 1/246 |
| | | | 343/810 |
| 8,149,177 B1 | 4/2012 | Callus et al. | |
| 8,248,298 B2 * | 8/2012 | Lalezari | H01Q 21/08 |
| | | | 342/120 |
| 8,581,794 B1 * | 11/2013 | Shor | H01Q 9/0421 |
| | | | 343/772 |
| 8,704,720 B2 * | 4/2014 | Kish | H01Q 3/242 |
| | | | 343/767 |
| 9,013,359 B2 * | 4/2015 | Lenormand | H01Q 21/0043 |
| | | | 343/771 |
| 9,395,727 B1 * | 7/2016 | Smith | G05D 1/0257 |
| 2006/0082515 A1 * | 4/2006 | Petropoulos | H01Q 1/241 |
| | | | 343/795 |
| 2006/0132374 A1 * | 6/2006 | Wang | H01Q 1/3275 |
| | | | 343/770 |
| 2008/0040004 A1 | 2/2008 | Breed | |
| 2008/0266195 A1 * | 10/2008 | Yamaguchi | H01Q 21/0043 |
| | | | 343/771 |
| 2010/0001916 A1 * | 1/2010 | Yamaguchi | H01Q 13/12 |
| | | | 343/771 |
| 2010/0141527 A1 * | 6/2010 | Lalezari | H01Q 21/24 |
| | | | 342/368 |
| 2010/0225528 A1 * | 9/2010 | Shijo | G01S 13/4463 |
| | | | 342/157 |
| 2010/0321265 A1 * | 12/2010 | Yamaguchi | H01Q 13/22 |
| | | | 343/771 |
| 2011/0175780 A1 * | 7/2011 | Gatti | H01Q 13/22 |
| | | | 343/766 |
| 2012/0056776 A1 * | 3/2012 | Shijo | G01S 7/03 |
| | | | 342/146 |
| 2012/0139786 A1 | 6/2012 | Puzella et al. | |

* cited by examiner

RADAR ANTENNA ASSEMBLY WITH PANORAMIC DETECTION

TECHNICAL FIELD OF INVENTION

This disclosure generally relates to a radar antenna assembly, and more particularly relates to an assembly with a horizontal array and a vertical array that cooperate to detect an object in a 360° panoramic area around a vehicle.

BACKGROUND OF INVENTION

A vehicle radar system with a panoramic field of view, i.e. with three-hundred-sixty degrees (360°) of coverage, is desirable for various vehicle functions such as automated driving and object detection for collision warning. A proposed system uses six radar units, one unit at each of the four corners of the vehicle, a fifth unit directed forward of the vehicle, and a sixth unit directed rearward of the vehicle. This configuration is undesirably expensive, and makes integration/fusion of the six signals from the six units difficult and complex.

SUMMARY OF THE INVENTION

Described herein is an antenna assembly configured to provide a panoramic field of view, i.e. 360 degree coverage, from within a single, small footprint package mounted atop a vehicle, e.g. see FIGS. 1 and 2. Advantages over the prior art include that the antenna assembly consists of two antennas arrays within a the single housing instead of the six radar units distributed to different locations on the vehicle as is the case for prior attempts to provide panoramic coverage. The antenna assembly is housed in a relatively low profile, small footprint housing similar to a 'shark-fin' shaped antenna commonly used by vehicle entertainment systems for receiving satellite radio signals. The antenna assembly advantageously employs vertical polarization of radar signals so radar signals can bend around the edges of the vehicle such that objects can be detected when located below a line of sight from the antenna that is limited or determined by a roofline of the vehicle assembly.

In accordance with one embodiment, a radar antenna assembly suitable to mount atop a vehicle as part of a radar system for the vehicle is provided. The assembly includes a horizontal array and a vertical array. The horizontal array is configured to preferentially detect objects in a forward area and a rearward area about the vehicle. The vertical array is configured to preferentially detect objects in a leftward area and a rightward area about the vehicle. The horizontal array and the vertical array cooperate to detect an object in a panoramic area that surrounds the vehicle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
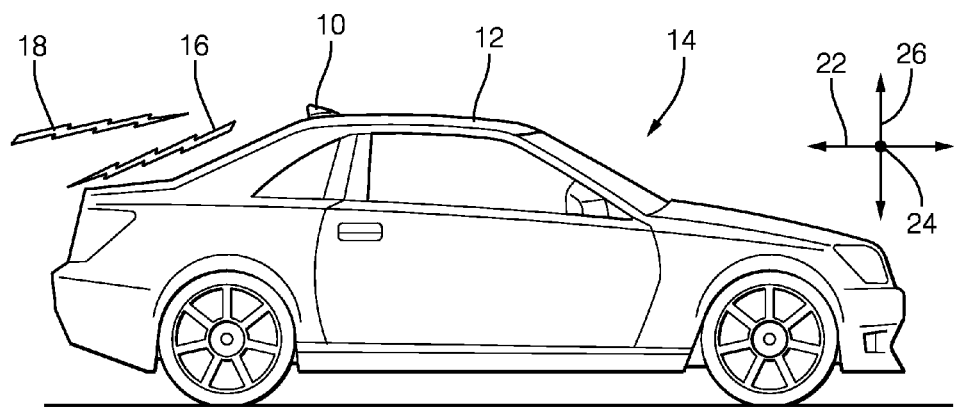
FIG. 1 is a side view of a vehicle equipped with a radar system that includes an antenna assembly in accordance with one embodiment.

FIG. 1 illustrates a non-limiting example of a radar antenna assembly, hereafter the assembly 10. The assembly 10 is advantageously configured to be suitable to mount atop a vehicle 12 as part of a radar system 14 for the vehicle 12. As will be described in more detail below, the assembly 10 provides for panoramic radar coverage about the vehicle 12, and is able to do so from a roof-top mounting location on the vehicle for the assembly 10. While not specifically shown, those in the art will recognize that the radar system 14 may include one or more radar transceivers connected to the assembly 10, and a controller configured to operate the radar transceivers to emit a radar signal 16 and detect a reflected signal 18 reflected by, for example, a following or trailing vehicle (not shown) traveling behind the vehicle 12. By way of example and not limitation, the example dimensions of various feature of the assembly 10 described herein are selected based on the radar signal 16 having an oscillation frequency of 76.5 GHz.

Figure 2:
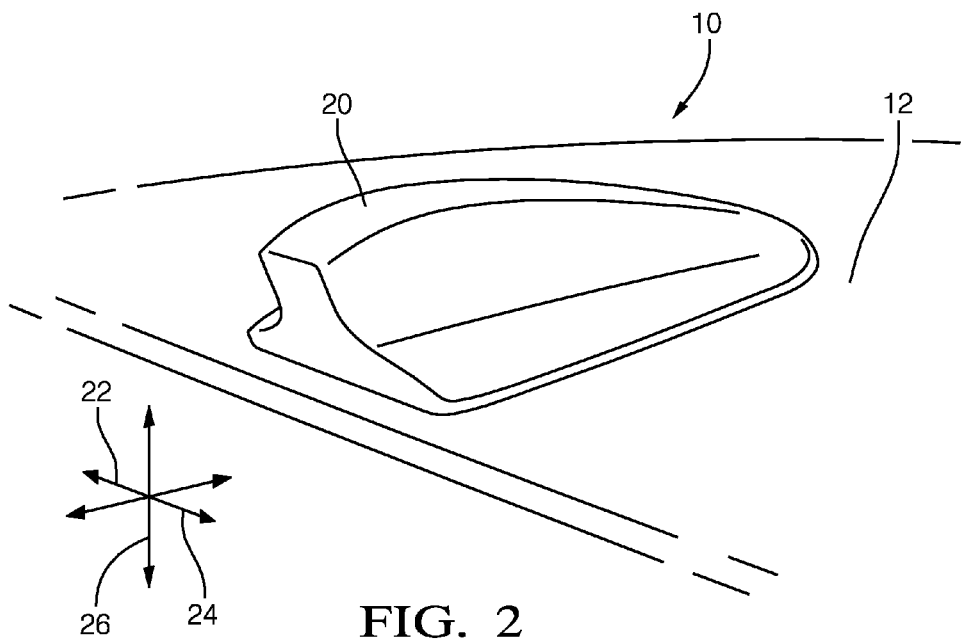
FIG. 2 is a close-up isometric view of the antenna assembly of FIG. 1 in accordance with one embodiment.

FIG. 2 further illustrates non-limiting details of the assembly 10, which may include a housing 20 with the shark-fin shape familiar to those in the satellite broadcast reception arts for vehicles. For the purpose of simplifying the description of the assembly 10 presented herein, and not intended to impart any particular limitation, various figures define several axes so direction relative to the assembly 10 and the vehicle 12 can be readily understood. The axes include a longitudinal axis 22 is defined that substantially corresponds to a forward direction and a rearward direction relative to the vehicle 12, a lateral axis 24 is defined that substantially corresponds to a leftward direction and a rightward direction relative to the vehicle 12, and a vertical axis 26 is defined that substantially corresponds to an upward direction and a downward direction relative to the vehicle 12. As used herein, the term 'substantially corresponds' is used to allow for difference between directions or axes aligned with or normal to the surface of the vehicle where the assembly 10 is mounted (e.g. the roof of the vehicle 12), and directions or axes aligned with or normal to the direction of gravity, generally normal to the surface of the Earth. That is, the various axes described herein may not be perfectly aligned with the Earth because of the slope roof of the vehicle 12 upon which the assembly 10 is mounted.

Figure 3:
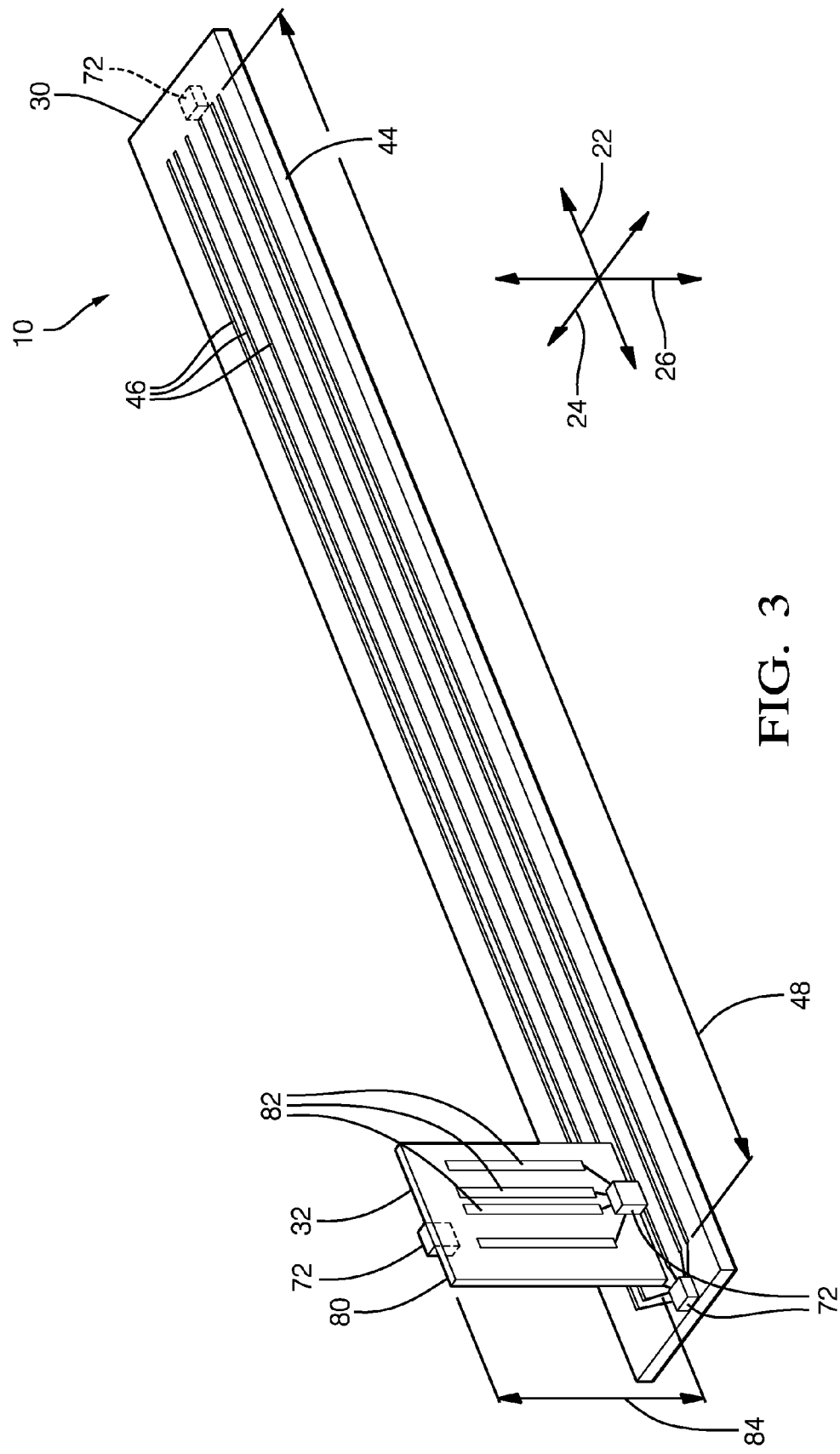
FIG. 3 is an isometric view of antenna arrays present within the antenna assembly of FIG. 1 in accordance with one embodiment.
Figure 4:
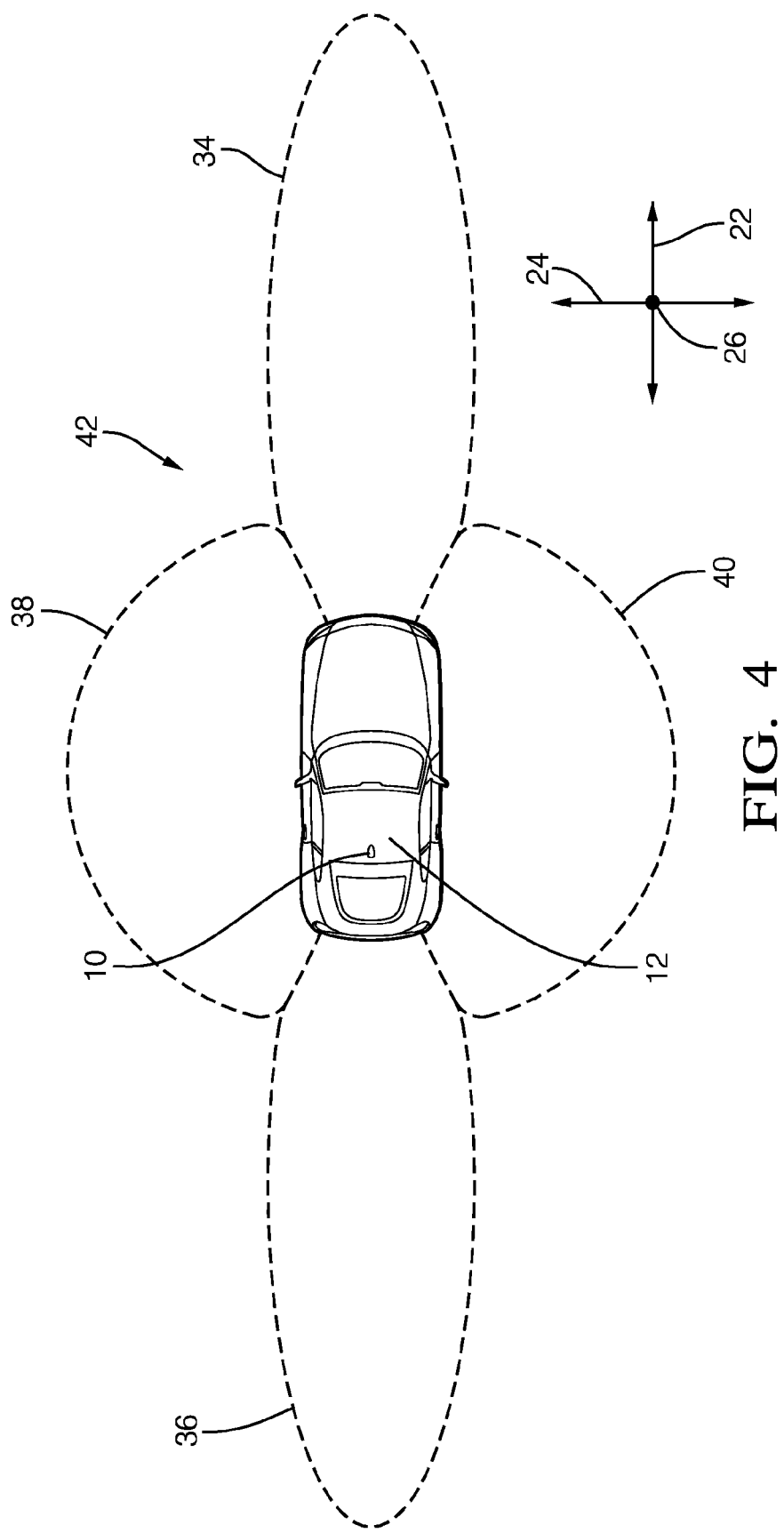
FIG. 4 is a top view of a panoramic coverage area provided by the antenna assembly of FIG. 1 in accordance with one embodiment.

FIG. 3 further illustrates non-limiting details of the assembly 10 with the housing 20 and other mechanical fixtures removed, as will be recognized by those in the art. As illustrated here, the assembly 10 includes a horizontal array 30 and a vertical array 32. The horizontal array 30 is generally configured to preferentially detect objects in a forward area 34 (FIG. 4) and a rearward area 36 relative to about the vehicle 12. The vertical array 32 is generally configured to preferentially detect objects in a leftward area 38 and a rightward area 40 relative to or about the vehicle 12. The horizontal array 30 and the vertical array 32 are also generally configured to cooperate with each other to detect an object in a panoramic area 42 that surrounds the vehicle 12. The varying distance from the vehicle 12 to the boundaries of the various areas (34, 36, 38, 40) are an indication of the relative range from the vehicle 12 or the assembly 10 that a particular test object is likely to be detected. As should be recognized, the characterization of the field of view of the assembly 10 or the radar system 14 as being panoramic or covering 360° does not mean that the sensitivity is necessarily uniform in every direction, but rather that there is not direction where the sensitivity is substantially zero. That is, there is not a direction where an object relatively close to the vehicle 12 could 'hide' from the radar system 14.

Figure 5A:
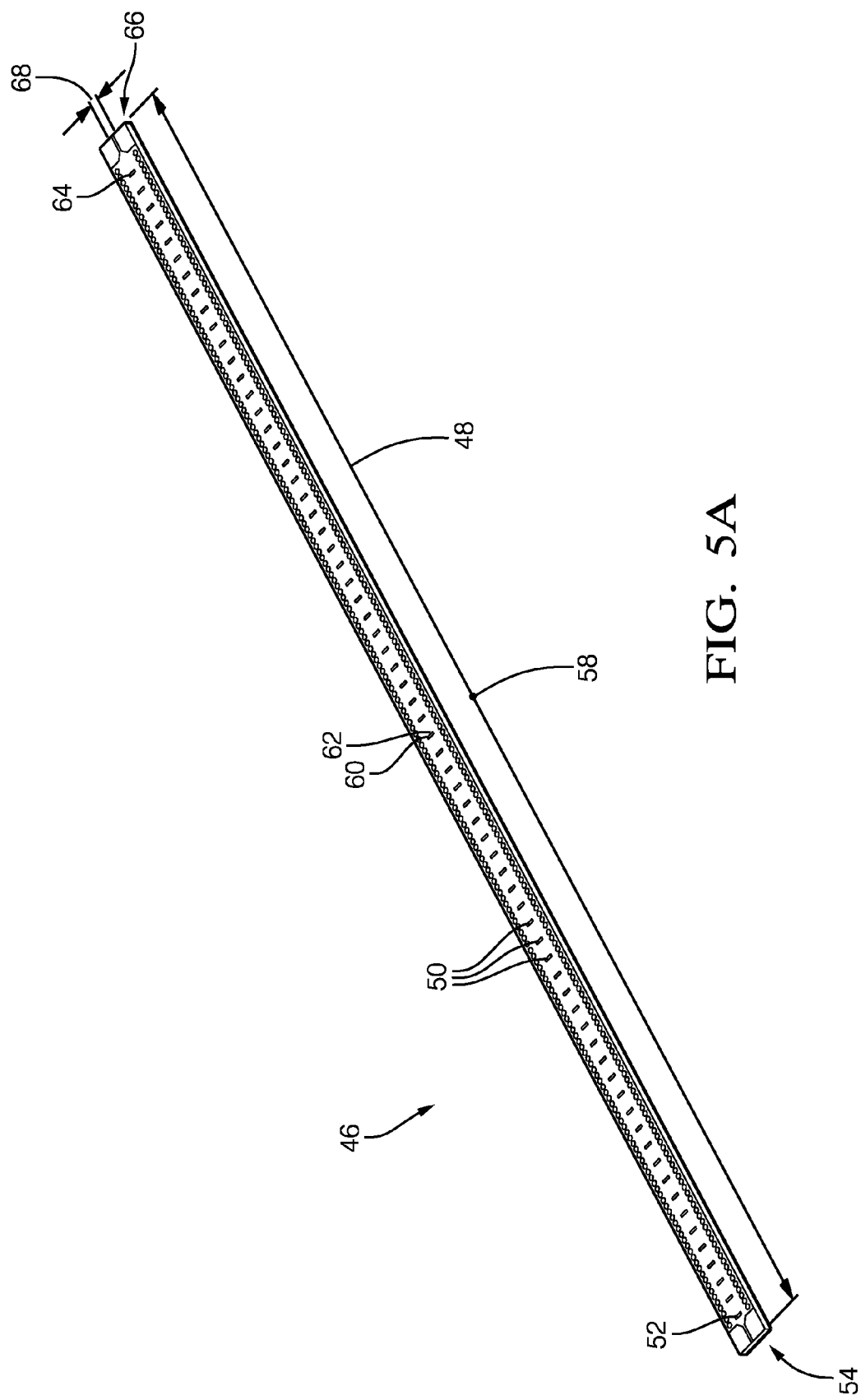
FIGS. 5A and 5B are isometric views of a horizontal array present within the antenna assembly of FIG. 1 in accordance with one embodiment.
Figure 5B:
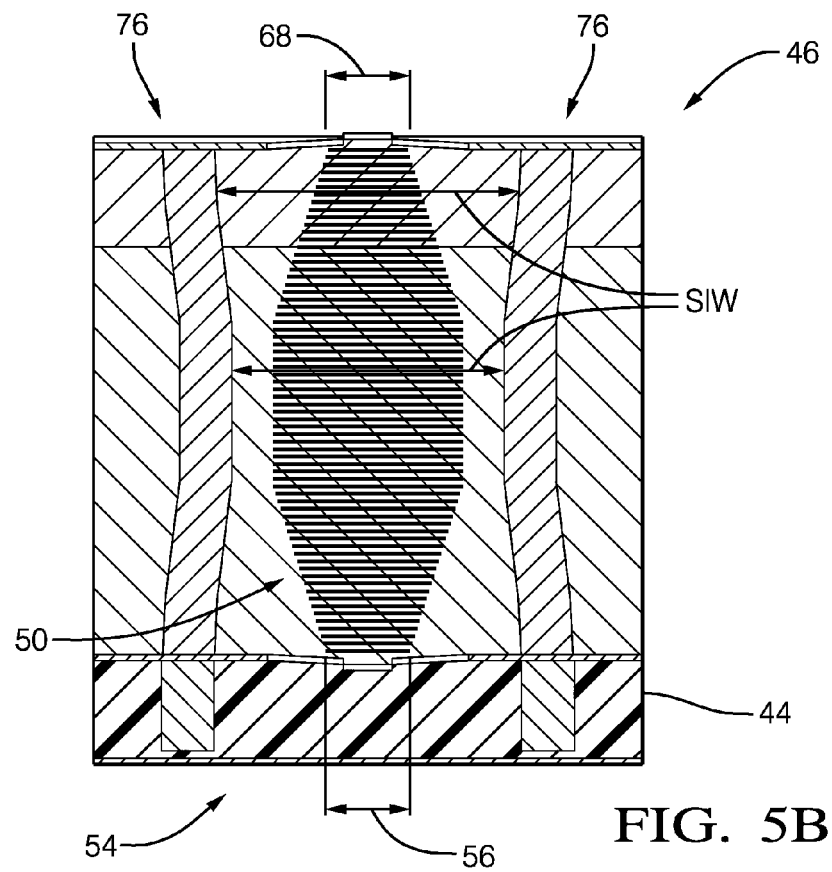
Figure 6:
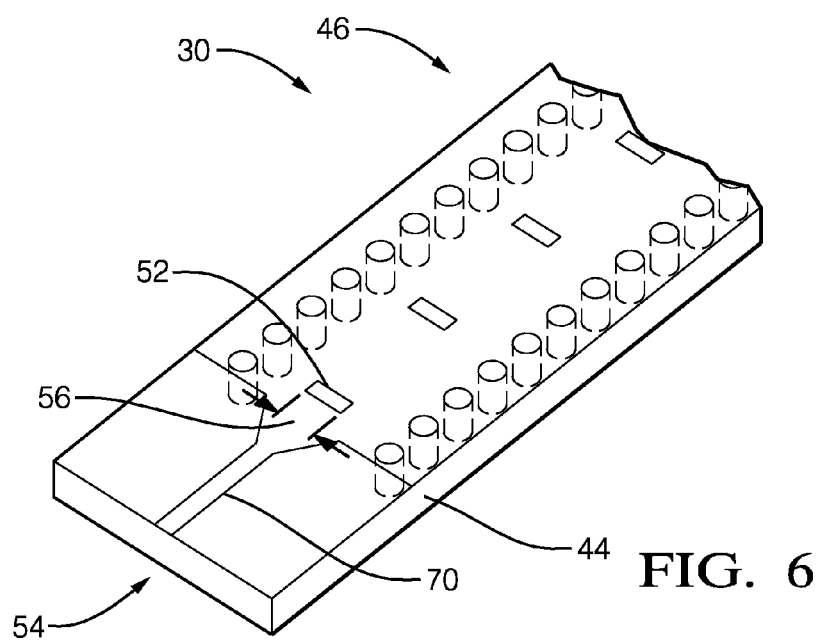
FIG. 6 is a close-up of FIG. 5A in accordance with one embodiment.

FIGS. 5A, 5B, and 6 in conjunction with FIG. 3 further illustrate non-limiting details of the assembly 10, in particular, details of the horizontal array 30. The horizontal array 30 includes a horizontal substrate 44 oriented substantially normal to the vertical axis 26. As used herein, the use of the term 'substantially normal' as opposed to simply 'normal' or 'exactly normal' to the vertical axis 26 is to allow for a roof angle of the vehicle 12 to tip the assembly 10 and thereby tip the horizontal array 30 to some orientation other than perfectly level, i.e. exactly normal to the vertical access. It is recognized that an extreme roof angle, a roof angle at more than thirty degrees of angle (30° angle) upward from level may cause problems with detecting objects forward of the vehicle 12. However, as will be explained in more detail later, the radar signal 16 (FIG. 1) emitted by the horizontal array 30 may be advantageously polarized to have a vertical polarization so that a radar signal emitted in a forward direction will tend to follow the ground plane provided by the roof of the vehicle 12, and scatter around the edge of the roof and the forward edge of the vehicle to better detect objects below a visual line of sight from the assembly which may be bounded on the bottom by the body (e.g. the hood) of the vehicle 12.

The horizontal array 30 includes or defines one or more antenna elements hereafter referred to individually as the directive element 46. In this non-limiting example, FIG. 3 shows six of the directive element 46 arranged upon the horizontal substrate 44, and FIGS. 5 and 6 show one of the six in more detail. A horizontal substrate suitable for the application described herein has a length of 122 millimeters (mm), a width of 40 mm, and is formed of TLP-5 available from Taconic Advanced Dielectric Division with a thickness of 0.76 mm.

In general, the directive element 46 is oriented such that a directive length 48 of the directive element 46 is measured in a direction substantially parallel to the longitudinal axis 22. By way of example and not limitation, a suitable value for the directive length 48 is 112 mm. As before, the phrase substantially parallel to the longitudinal axis is used to allow for a direction or angle that is not precisely aligned with a particular axis due to the roof angle proximate to where the assembly 10 is mounted onto the roof of the vehicle 12.

The directive element 46 described herein may be characterized as a substrate integrated waveguide (SIW) slot array with a microstrip 70 electrically connected to a Monolithic Microwave Integrated Circuit (MMIC 72), and may also be referred to by some as an end-fire antenna. The MMIC 72 may include the aforementioned radar transceiver, and may be connected to the microstrip 70 by wire-bonding, as will be recognized by those in the art. When electromagnetic energy is fed into an end of this type of antenna, radiation is directed along the length of the antenna creating a beam that propagates in that same direction. Such an antenna may be fed from the opposite end as illustrated to emit a beam in the opposite direction. It is noted that a forward beam and a rearward beam can be generated simultaneously so forward and rearward detection can be performed simultaneously. It is noted that as the horizontal array 30 is configured to emit a vertically-polarized radar signal, it follows that the horizontal array 30 also preferentially detects a vertically-polarized reflected signal.

Continuing to refer to FIGS. 5A and 5B, the directive element 46 includes a plurality of directive slots 50 arrayed in a longitudinal direction substantially parallel to the longitudinal axis 22, where any deviation from the longitudinal axis is primarily due to the roof angle of the vehicle 12. For this non-limiting example, a suitable number of slots for the directive element 46 would include seventy-three slots. Each of the plurality of directive slots 50 is characterized by a lateral length measured in a lateral direction parallel to the lateral axis 24. The plurality of directive slots 50 include a first lateral slot 52 located proximate to a first end 54 of the directive element 46, and the lateral length of the first lateral slot 52 is characterized by a first lateral value 56, for example 0.466 mm.

The plurality of directive slots 50 also include a middle lateral slot 60 located proximate to a mid-point 58 of the directive element 46 and the lateral length of the middle lateral slot 60 is characterized by a middle lateral value 62, for example 1.07 mm. Instead of forming all of the slots to have the same lateral length, the plurality of directive slots 50 may advantageously be configured so that the lateral lengths of the plurality of directive slots 50 vary progressively from the first lateral value 56 to the middle lateral value 62. As illustrated in this non-limiting example, the first lateral value 56 may be advantageously less than the middle lateral value 62.

The plurality of directive slots 50 may also include a last lateral slot 64 located proximate to a second end 66 of the directive element 46 that is opposite the first end 54. Like the first lateral slot 52, the lateral length of the last lateral slot 64 may be characterized by a last lateral value 68 that may be equal to the first lateral value 56. As illustrated, the lateral length of the plurality of directive slots 50 may also vary progressively from a last lateral value 68 to the middle lateral value 62, where the last lateral value 68 may be less than the middle lateral value 62. As illustrated, a via fence 76 is used to define an SIW width 74 in a direction parallel to the lateral axis 24. The SIW width 74 is varied to be wider at the first end 54 and the second end 66, and gradually narrows down towards the midpoint 58 of the directive element 46. The advantage of varying the SIW width 74 and the lateral length of the plurality of directive slots 50 along the directive element 46 is that a 'taper' is formed whereby the side-lobe characteristic of the radar signal 16 emitted by the directive element 46 is improved.

Figure 7:
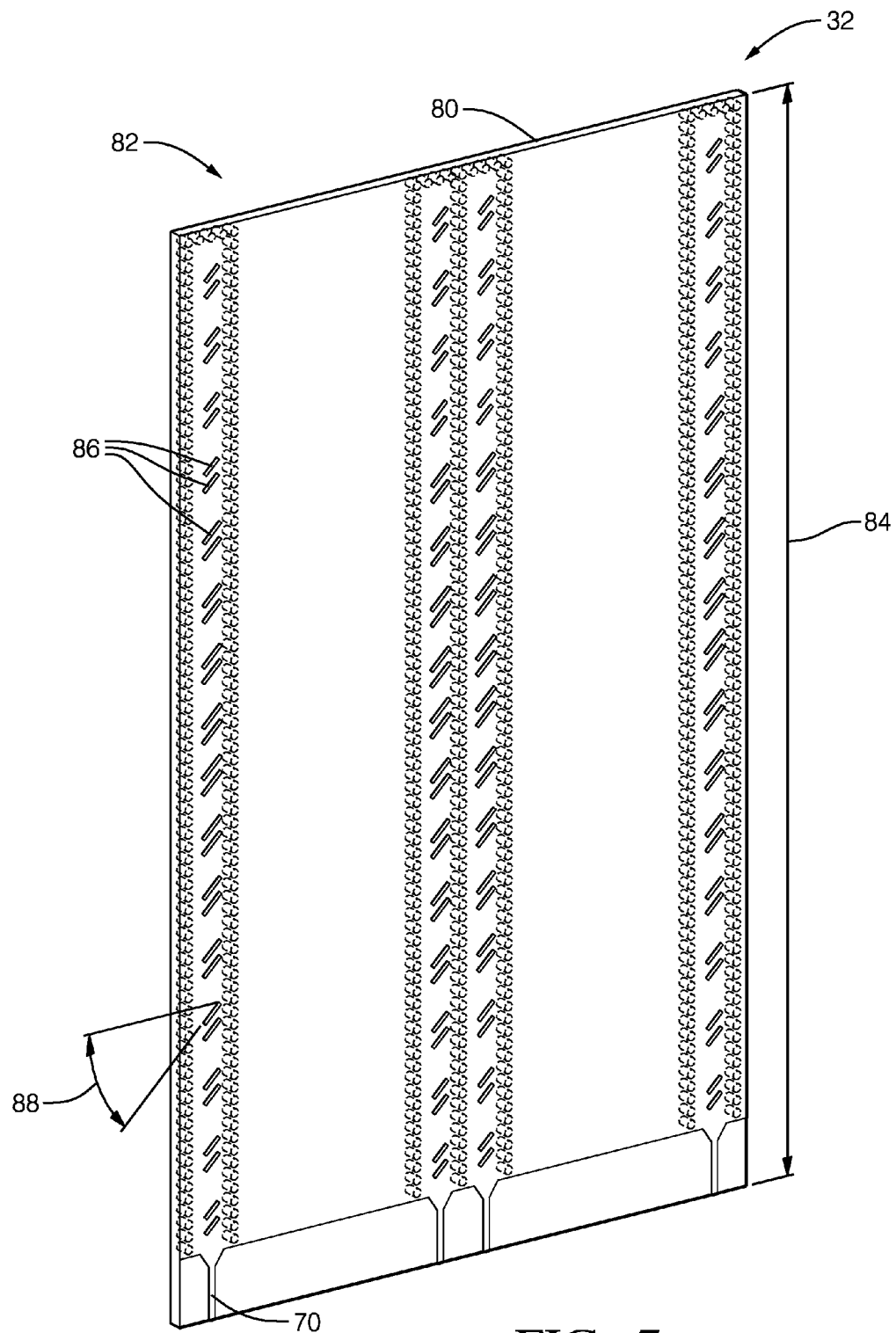
FIG. 7 is an isometric view of a vertical array present within the antenna assembly of FIG. 1 in accordance with one embodiment.
Figure 8:
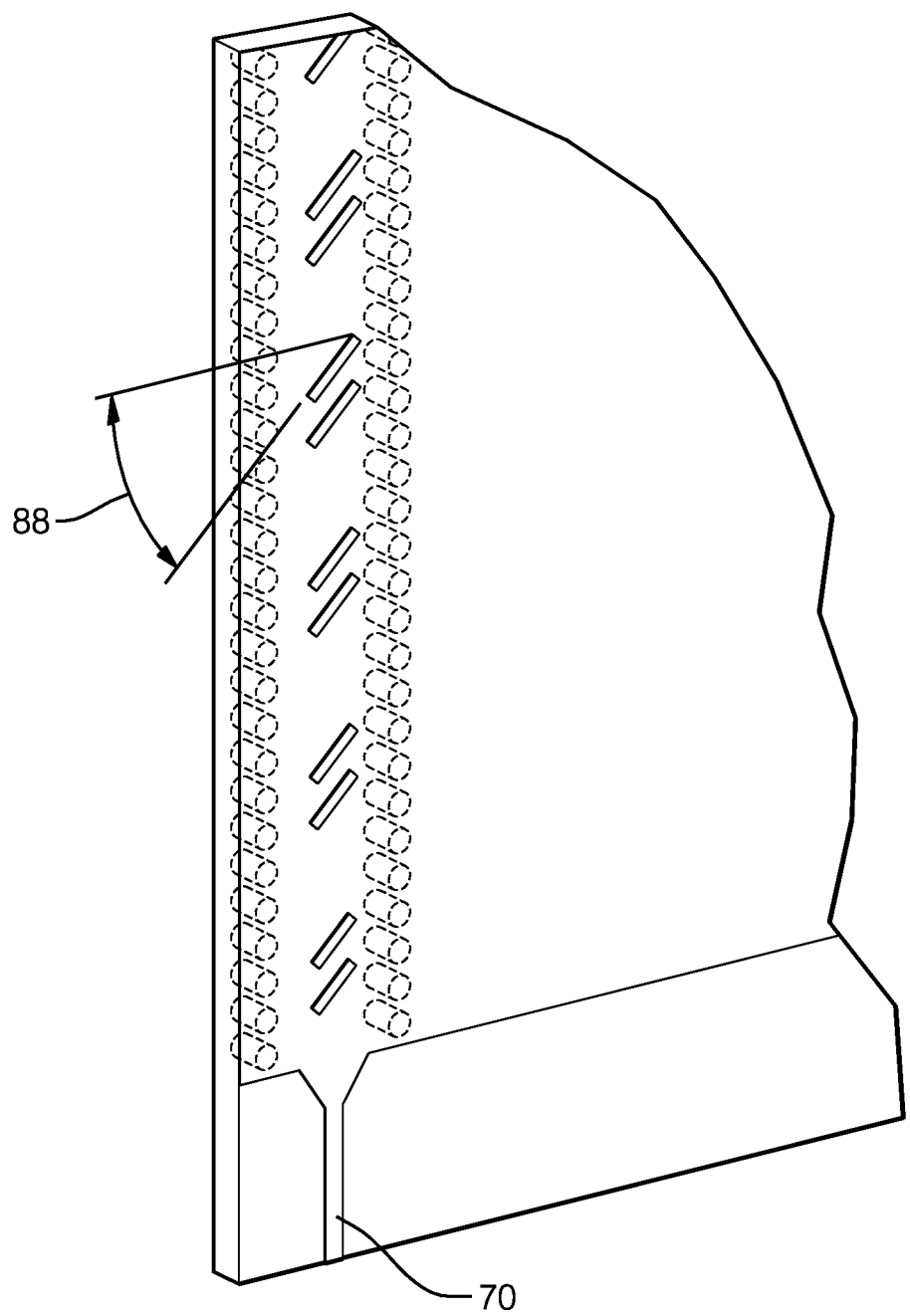
FIG. 8 is a close-up of FIG. 7 in accordance with one embodiment.

FIGS. 7 and 8 in conjunction with FIG. 3 further illustrate non-limiting details of the assembly 10, in particular, details of the vertical array 32. The vertical array 32 includes a vertical substrate 80 oriented normal to the lateral axis 24. The vertical array 32 includes or defines one or more antenna elements that cooperate to produce fan-shaped beam in a horizontal plane (normal to the vertical axis), hereafter referred to individually as the fan element 82. The fan element 82 is oriented such that a fan length 84 of the fan element is measured in a vertical direction substantially parallel to the vertical axis 26. In this non-limiting example, FIG. 3 shows four of the fan element 82 arranged upon each or opposite sides of the fan element 82 for a total of eight of the fan element 82 on the vertical array 32. FIG. 7 illustrates four of the fan element 82 on one side of the vertical array 32, and FIG. 8 illustrates one of the fan element 82 in more detail. The vertical substrate 80 suitable for the application described herein has a length of 40 mm, a width of 30 mm, and is formed of RO4835 available from Rogers Corporation with a thickness of 0.508 mm.

In general, the fan element 82 is oriented such that the fan length 84 of the fan element 82 is measured in a direction substantially parallel to the vertical axis 26. By way of example and not limitation, a suitable value for the fan element 82 is 38.0 mm. As before, the phrase 'substantially parallel' to the vertical axis is used to allow for a direction or angle that is not precisely aligned with a particular axis due to the roof angle proximate to where the assembly 10 is mounted onto the roof of the vehicle 12.

The fan element 82 in this non limiting example is also an SIW slot array type element similar to the directive element 46. However, the plurality of fan slots 86 are oriented at a forty-five degree (45°) angle relative to the direction that the fan length 84 is measured. A suitable value for the number of fan slots is thirty-two. The fan element includes a plurality of fan slots, each fan slot characterized by an orientation angle 88 of angular displacement relative to the longitudinal axis. This hybrid or non-substantially parallel orientation allows both a wide field of view in the lateral direction, and detection below the roofline. That is, the orientation angle 88 can be selected closer to horizontal to provide a radar signal closer to vertical polarization for better look-down characteristics due to scattering, or selected closer to vertical to provide a wider, more uniform lateral radar coverage to the leftward area 38 (FIG. 4) and the rightward area 40. The end-feed allows for easy connection with the transceiver chip. It should be recognized that the multi-transmit and multi-receive nature of the assembly 10 allows for digital beam-forming. The fan slots are grouped in pairs and each pair is spaced one quarter guided wavelength for the purpose of better matching, while separation between pairs is one guided wave for boresight radiation. The length/width of the fan slots are also tapered for low side-lobe.

Accordingly, the vertical array 32 is configured to emit an angle-polarized radar signal and preferentially detect an angle-polarized reflected signal. As a trade-off between look-down capability and field of view width, the angle-polarized radar signal may be polarized at forty-five degrees of angle (45° angle) relative to the vertical axis 26. As such, the orientation angle 88 is forty-five degrees of angle (45° angle). The fan beam antenna for the two side coverage is built on a single substrate. This innovative configuration allows for cost and space savings with minimal antenna to antenna interaction.

Accordingly, a radar antenna assembly (the assembly 10) is provided. The assembly 10 is compact and can be packaged in a low profile and small footprint housing. The assembly 10 can be mounted in a packaging similar to that of the shark-fin antenna that is currently being used for automotive satellite radio. The assembly 10 is suitable for autonomous driving applications where entire 360° coverage is required. It is recognized that the directive element 46 and fan element 82 described above could be other types of radiating elements, a monopole or patch type configuration for example.

While this invention has been described in terms of the preferred embodiments thereof, it is not intended to be so limited, but rather only to the extent set forth in the claims that follow.

I claim:

1. A radar antenna assembly suitable to mount atop a vehicle as part of a radar system for the vehicle, said assembly comprising:
    a horizontal array configured to detect objects in a forward area and a rearward area about the vehicle; and
    a vertical array configured to detect objects in a leftward area and a rightward area about the vehicle, wherein the horizontal array and the vertical array cooperate to detect an object in a panoramic area that surrounds the vehicle.

2. The assembly in accordance with claim 1, wherein the assembly defines
    a longitudinal axis is defined that substantially corresponds to a forward direction and a rearward direction relative to the vehicle,
    a lateral axis is defined that is perpendicular to the longitudinal axis, and corresponds to a leftward direction and a rightward direction relative to the vehicle, and
    a vertical axis is defined that is perpendicular to the longitudinal axis and the lateral axis, and that substantially corresponds to an upward direction and a downward direction relative to the vehicle.

3. The assembly in accordance with claim 2, wherein the horizontal array includes a horizontal substrate oriented normal to the vertical axis, and a directive element defined by the horizontal array and oriented such that a directive length of the directive element is measured in a direction parallel to the longitudinal axis.

4. The assembly in accordance with claim 3, wherein the horizontal array is configured to emit a vertically-polarized radar signal and detect a vertically-polarized reflected signal.

5. The assembly in accordance with claim 3, wherein the directive element includes a plurality of directive slots arrayed in a longitudinal direction parallel to the longitudinal axis, and each of the plurality of directive slots is characterized by a lateral length measured in a lateral direction parallel to the lateral axis, wherein the plurality of directive slots include a first lateral slot located proximate to a first end of the directive element and the lateral length is characterized by a first lateral value, and a middle lateral slot located proximate to a mid-point of the directive element and the lateral length is characterized by a middle lateral value, wherein the lateral lengths of the plurality of directive slots vary progressively from the first lateral value to the middle lateral value.

6. The assembly in accordance with claim 5, wherein the first lateral value is less than the middle lateral value.

7. The assembly in accordance with claim 5, wherein the wherein the plurality of directive slots include a last lateral slot located proximate to a second end of the directive element opposite the first end, wherein the lateral length of the last lateral slot is characterized by a last lateral value, and the lateral length of the plurality of directive slots varies progressively from a last lateral value to the middle lateral value.

8. The assembly in accordance with claim 7, wherein the last lateral value is less than the middle lateral value.

9. The assembly in accordance with claim 2, wherein the vertical array includes a vertical substrate oriented normal to the lateral axis, and a fan element defined by the vertical array and oriented such that a fan length of the fan element is measured in a vertical direction parallel to the vertical axis.

10. The assembly in accordance with claim 9, wherein the vertical array is configured to emit an angle-polarized radar signal and detect an angle-polarized reflected signal.

11. The assembly in accordance with claim 10, wherein the angle-polarized radar signal is polarized at forty-five degrees of angle (45° angle) relative to the vertical axis.

12. The assembly in accordance with claim 9, wherein the fan element includes a plurality of fan slots, each fan slot characterized by an orientation angle of angular displacement relative to the longitudinal axis.

13. The assembly in accordance with claim 12, wherein the orientation angle is forty-five degrees of angle (45° angle).

* * * * *